(12) United States Patent
Nakai et al.

(10) Patent No.: US 10,157,719 B2
(45) Date of Patent: Dec. 18, 2018

(54) GAS CIRCUIT BREAKER

(71) Applicant: HITACHI, LTD., Tokyo (JP)

(72) Inventors: Yuki Nakai, Tokyo (JP); Masanao Terada, Tokyo (JP); Hajime Urai, Tokyo (JP); Takashi Iida, Tokyo (JP); Noriyuki Yaginuma, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 15/608,041

(22) Filed: May 30, 2017

(65) Prior Publication Data

US 2017/0345593 A1    Nov. 30, 2017

(30) Foreign Application Priority Data

May 31, 2016    (JP) .................. 2016-108073

(51) Int. Cl.
| | | |
|---|---|---|
| *H01H 33/91* | (2006.01) | |
| *H01H 33/08* | (2006.01) | |
| *H01H 33/42* | (2006.01) | |
| *H01H 33/74* | (2006.01) | |
| *H01H 33/78* | (2006.01) | |
| *H01H 71/02* | (2006.01) | |
| *H01H 71/10* | (2006.01) | |
| *H01H 71/32* | (2006.01) | |

(Continued)

(52) U.S. Cl.
CPC ............ *H01H 33/91* (2013.01); *H01H 33/08* (2013.01); *H01H 33/42* (2013.01); *H01H 33/74* (2013.01); *H01H 33/78* (2013.01); *H01H 71/025* (2013.01); *H01H 71/10* (2013.01); *H01H 71/326* (2013.01); *H01H 73/18* (2013.01); *H02B 13/025* (2013.01); *H02B 13/045* (2013.01); *H02B 13/055* (2013.01); *H01H 2221/088* (2013.01)

(58) Field of Classification Search
CPC ........ H01H 33/91; H01H 33/08; H01H 33/42; H01H 33/78; H01H 33/04; H01H 33/7015; H01H 71/025; H01H 71/10; H01H 71/326; H01H 73/18; H01H 33/74; H02B 13/045; H02B 13/055; H02B 13/025
USPC .................................. 218/146, 56–61, 63, 65
See application file for complete search history.

(56) References Cited

U.S. PATENT DOCUMENTS

| | | | | |
|---|---|---|---|---|
| 4,749,831 A | * | 6/1988 | Hosomi ............... | H02B 13/035 218/57 |
| 5,723,839 A | * | 3/1998 | Kozawa ................. | H01H 33/02 218/43 |

(Continued)

*Primary Examiner* — Renee S Luebke
*Assistant Examiner* — William Bolton
(74) *Attorney, Agent, or Firm* — Volpe and Koenig, P.C.

(57) ABSTRACT

A gas circuit breaker includes a sealed tank, a movable side main electrode and a fixed side main electrode in the sealed tank facing each other, a movable side arc electrode and a fixed side arc electrode in the sealed tank facing each other, a cylinder at a circumference of the movable side arc electrode, a piston in the cylinder in a slidable manner and forming a puffer chamber together with the cylinder, an insulation nozzle in the sealed tank, an exhaust pipe at a circumference of the fixed side arc electrode and exhausting heat gas, which is sprayed on an arc generated in the insulation nozzle in the opening electrode operation, to an outside, and a closing plate in the exhaust pipe. One or more vent holes leading the heat gas from an inside of the exhaust pipe to the outside is on a surface of the closing plate.

2 Claims, 6 Drawing Sheets

(51) Int. Cl.
*H01H 73/18* (2006.01)
*H02B 13/025* (2006.01)
*H02B 13/045* (2006.01)
*H02B 13/055* (2006.01)

(56) References Cited

U.S. PATENT DOCUMENTS

| | | | | |
|---|---|---|---|---|
| 5,814,781 | A * | 9/1998 | Koyanagi | H01H 33/904 |
| | | | | 218/60 |
| 5,850,065 | A * | 12/1998 | Yaginuma | H01H 33/74 |
| | | | | 218/76 |
| 6,621,030 | B2 * | 9/2003 | Andou | H01H 33/56 |
| | | | | 218/43 |
| 6,660,954 | B2 * | 12/2003 | Iwabuchi | H01H 33/91 |
| | | | | 218/52 |
| 8,389,886 | B2 * | 3/2013 | Dahlquist | H01H 33/74 |
| | | | | 218/59 |
| 8,674,253 | B2 * | 3/2014 | Uchii | H01F 27/321 |
| | | | | 218/59 |
| 9,076,611 | B2 * | 7/2015 | Cernat | H01H 33/7015 |
| 2014/0209568 | A1 | 7/2014 | Cernat et al. | |

* cited by examiner

GAS CIRCUIT BREAKER

BACKGROUND OF THE INVENTION

1. Field of the Invention

The present invention relates to a gas circuit breaker for interrupting short circuit current in a power system.

2. Description of the Related Art

A gas circuit breaker for interrupting short circuit current is arranged in a power system. The gas circuit breaker is formed, for example, to spray insulation gas with high voltage on an arc when the arc is generated because of failure of the power system due to lightning or the like and the short circuit current is flowed. With this, the gas circuit breaker interrupts the short circuit current by extinguishing the arc (arc extinction).

The gas circuit breaker is provided with a sealed tank in which the insulation gas is fulfilled, and a movable side electrode, a fixed side electrode, a cylinder, a piston, an insulation nozzle, and an exhaust pipe arranged inside the sealed tank.

The movable side electrode is provided with a movable side main electrode and a movable side arc electrode. On the other hand, the fixed side electrode is provided with a fixed side main electrode and a fixed side arc electrode. The movable side main electrode and the fixed side main electrode are arranged to face each other in such a manner in which opening electrode operation and closing electrode operation can be performed. Similarly, the movable side arc electrode and the fixed side arc electrode are arranged to face each other in such a manner in which opening electrode operation and closing electrode operation can be performed.

The cylinder is arranged at a circumference of the movable side arc electrode. The piston is arranged inside the cylinder in a slidable manner. The cylinder and the piston form a puffer chamber formed as a mechanical compression chamber for the insulation gas.

The insulation nozzle is arranged inside the cylinder at a distal end side of the cylinder. The exhaust pipe is arranged at a circumference of the fixed side arc electrode. The exhaust pipe is arranged for cooling the insulation gas (hereinafter, referred to as "heat gas") with a high temperature when the insulation gas is sprayed on the arc generated inside the insulation nozzle in the opening electrode operation.

In such a gas circuit breaker, a high electric field part is formed near a circumferential edge part at a distal end of the exhaust pipe, and when the heat gas with a high temperature reaches the high electric field part, dielectric strength between the exhaust pipe and the sealed tank is reduced due to heat of the heat gas. As a result, grounding is easily generated between the exhaust pipe and the sealed tank (especially, near the high electric field part). In order to prevent the generation of the grounding, the gas circuit breaker is desired to cool the heat gas efficiently.

Thus, a gas circuit breaker in which a length of a passage of the heat gas toward the high electric field part is lengthened by arranging a pipe inside the exhaust pipe and a resistance of the passage is increased by arranging a plate inside the passage in order to cool the heat gas efficiently is proposed (see US 2014/0209568 A).

SUMMARY OF THE INVENTION

However, in the conventional gas circuit breaker disclosed in US 2014/0209568 A, since the number of parts is large which leads a complicated structure, assembling man hour is increased and a cost in manufacturing is increased.

The present invention is derived to solve the problem described above, and a main object of the present invention is to provide a gas circuit breaker which cools heat gas efficiently with a simple structure having the small number of parts.

In order to achieve the object, a gas circuit breaker according to the present invention includes: a sealed tank; a movable side main electrode and a fixed side main electrode arranged in the sealed tank to face each other in such a manner in which opening electrode operation and closing electrode operation can be performed; a movable side arc electrode and a fixed side arc electrode arranged in the sealed tank to face each other in such a manner in which opening electrode operation and closing electrode operation can be performed; a cylinder arranged at a circumference of the movable side arc electrode; a piston arranged in the cylinder in a slidable manner, the piston forming a puffer chamber together with the cylinder; an insulation nozzle arranged in the sealed tank; an exhaust pipe arranged at a circumference of the fixed side arc electrode and configured to exhaust heat gas, which is sprayed on an arc generated in the insulation nozzle in the opening electrode operation, to an outside; and a closing plate arranged in the exhaust pipe, wherein one or more vent hole(s) which leads the heat gas from an inside of the exhaust pipe to the outside is formed on a surface of the closing plate.

The gas circuit breaker has the closing plate inside the exhaust pipe. One or more vent hole(s) which leads the heat gas from an inside of the exhaust pipe toward the outside is formed on a surface of the closing plate. With such a gas circuit breaker, a time until the heat gas reaches the high electric field part can be extended. Thus, the gas circuit breaker can cool the heat gas efficiently with a simple structure having the small number of parts.

Other aspects are described below.

According to the present invention, the heat gas can be cooled efficiently with the simple structure having the small number of parts.

DESCRIPTION OF THE PREFERRED EMBODIMENTS

Hereinafter, embodiments of the present invention (hereinafter, referred to as "present embodiments") are described in detail with reference to drawings. Further, each figure is merely illustrated schematically to understand the present invention sufficiently. Accordingly, the present invention is not limited to the illustrated examples. Further, in each figure, the same reference numerals are given for the common components or the same components in respective figures, and redundant description thereof is therefore omitted.

Embodiment 1

<A Configuration of a Gas Circuit Breaker>

Figure 1:
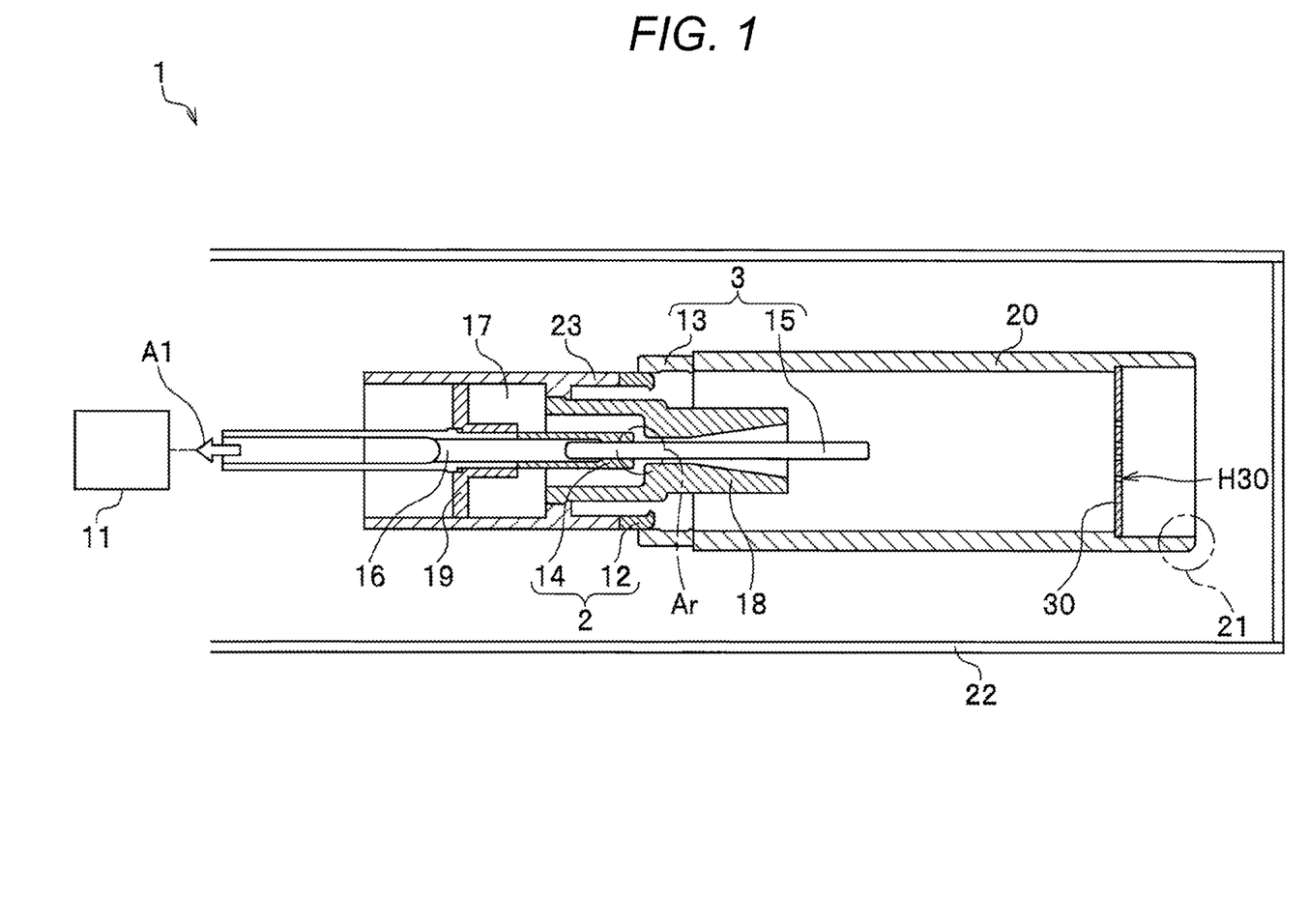
FIG. 1 is a cross-sectional view illustrating a configuration of a gas circuit breaker according to an embodiment 1.
Figure 2:
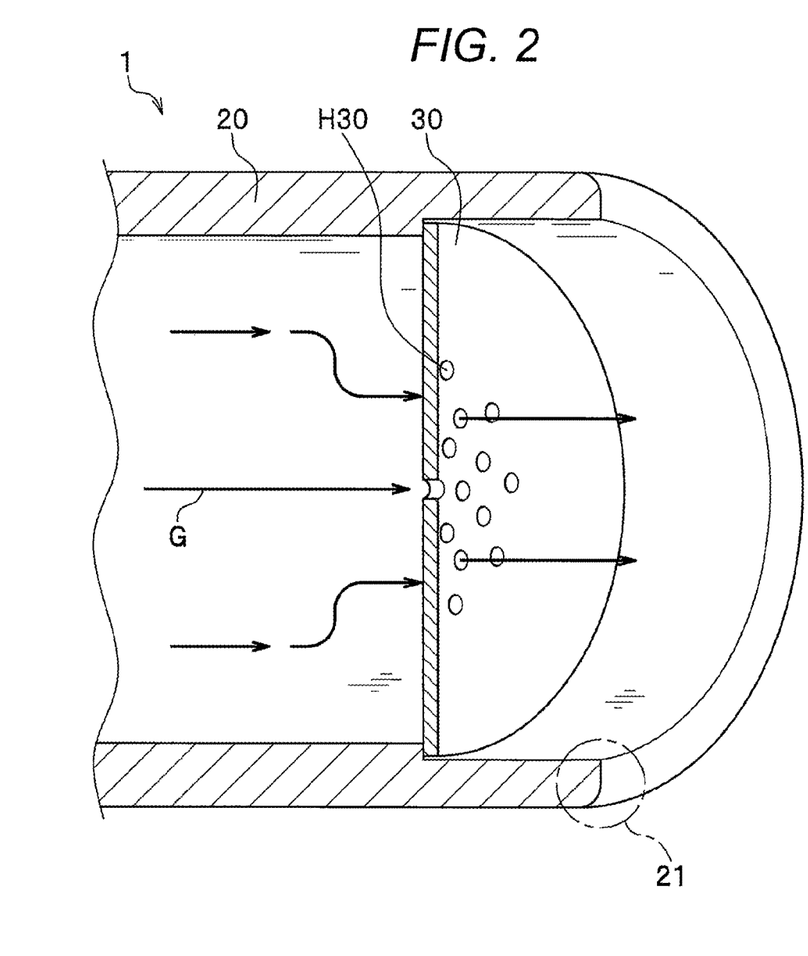
FIG. 2 is a view illustrating a configuration of a closing plate of the gas circuit breaker according to the embodiment 1.

Hereinafter, a configuration of a gas circuit breaker 1 according to a present embodiment 1 is described with reference to FIG. 1 and FIG. 2. FIG. 1 is a cross-sectional view illustrating the configuration of the gas circuit breaker 1 according to the present embodiment 1. FIG. 2 is a view illustrating a configuration of a closing plate 30 of the gas circuit breaker 1.

As shown in FIG. 1, the gas circuit breaker 1 is provided with a sealed tank 22 in which insulation gas is fulfilled, and a movable side electrode 2, a fixed side electrode 3, an insulation nozzle 18, a piston 19, an exhaust pipe 20, and a cylinder 23 arranged inside the sealed tank 22.

The movable side electrode 2 is provided with a movable side main electrode 12 and a movable side arc electrode 14. On the other hand, the fixed side electrode 3 is provided with a fixed side main electrode 13 and a fixed side arc electrode 15. The movable side main electrode 12 and the fixed side main electrode 13 are arranged to face each other in such a manner in which opening electrode operation and closing electrode operation can be performed. Similarly, the movable side arc electrode 14 and the fixed side arc electrode 15 are arranged to face each other in such a manner in which opening electrode operation and closing electrode operation can be performed.

The insulation nozzle 18 is arranged inside the cylinder 23 at a distal end side of the cylinder 23. The piston 19 is arranged inside the cylinder 23 in a slidable manner. The exhaust pipe 20 is arranged at a circumference of the fixed side arc electrode 15. The cylinder 23 is arranged at a circumference of the movable side arc electrode 14.

The insulation nozzle 18 and the movable side main electrode 12 are arranged coaxially with the movable side arc electrode 14. The movable side main electrode 12 is connected to the cylinder 23. The cylinder 23 and the piston 19 form a puffer chamber 17 formed as a mechanical compression chamber for the insulation gas. That is, the puffer chamber 17 is formed at a space inside the cylinder 23.

Further, the gas circuit breaker 1 is provided with an operation device 11 which operates movement (slide) of the movable side electrode 2 (the movable side main electrode 12 and the movable side arc electrode 14) and the cylinder 23 via a shaft 16. One end of the shaft 16 is connected to the operation device 11 and another end of the shaft 16 is connected to the movable side arc electrode 14.

A closing plate 30 is arranged inside the exhaust pipe 20. Further, as shown in FIG. 2, one or more vent hole(s) H30 which leads the heat gas from the inside of the exhaust pipe 20 toward the outside is formed on a surface of the closing plate 30. Here, it is described as the exhaust pipe 20 is formed in a cylindrical shape and the closing plate 30 is formed in a circular plate shape. However, the exhaust pipe 20 may be formed in, for example, a polygonal cylindrical shape. In this case, the closing plate 30 is formed in a shape corresponding a sectional shape of the exhaust pipe 20.

In such a gas circuit breaker 1, the movable side main electrode 12 is pressed by means of pressure of oil pressure, spring pressure or the like of the operation device 11 via the shaft 16 in a normal connecting state so that the movable side main electrode 12 is located at a position in which the movable side main electrode 12 and the fixed side main electrode 13 are electrically connected with each other. With this, the gas circuit breaker 1 forms a circuit of a power system in the normal connecting state. At this time, the movable side arc electrode 14 and the fixed side arc electrode 15 are physically connected with each other. Further, at this time, the insulation gas is compressed in the puffer chamber 17.

As the insulation gas, for example, sulfur hexafluoride ($SF_6$) may be utilized. However, the insulation gas is not limited to sulfur hexafluoride, and other gas having insulation performance such as dry air, nitrogen may be utilized.

In such a configuration, when an arc is generated because of failure of the power system due to lightning or the like and short circuit current is flowed, an opening electrode instruction is sent to the gas circuit breaker 1 from a monitoring device. In response to this, the gas circuit breaker 1 operates the operation device 11 in an opening electrode direction and moves the movable side arc electrode 14 to a side of the operation device 11 via the shaft 16 in order to interrupt the short circuit current. As a result, the movable side arc electrode 14 and the fixed side arc electrode 15 are switched to a state in which the movable side arc electrode 14 and the fixed side arc electrode 15 are physically separated (a state being away from each other). At this time, at first, the movable side main electrode 12 and the fixed side main electrode 13 are separated and after that, the movable side arc electrode 14 and the fixed side arc electrode 15 are separated. At that time, an arc is generated in a region Ar between the movable side arc electrode 14 and the fixed side arc electrode 15. Hereinafter, the region Ar is called "arc generation part Ar".

The gas circuit breaker 1 is formed to spray the insulation gas with high pressure compressed in the puffer chamber 17 on the arc in order to extinguish the arc. At this time, the insulation gas with high pressure sprayed on the arc becomes a high temperature. Accordingly, the insulation gas (the heat gas) with a high temperature is generated in the arc generation part Ar. The insulation gas (the heat gas) with a high temperature is passed through the inside of the insulation nozzle 18 and the inside of the exhaust pipe 20 and the insulation gas with a high temperature is exhausted into the sealed tank 22 from a distal end side of the exhaust pipe 20 while being cooled in the middle of the process. A high electric field part 21 is formed near a circumferential edge part at the distal end side of the exhaust pipe 20.

Figure 6:
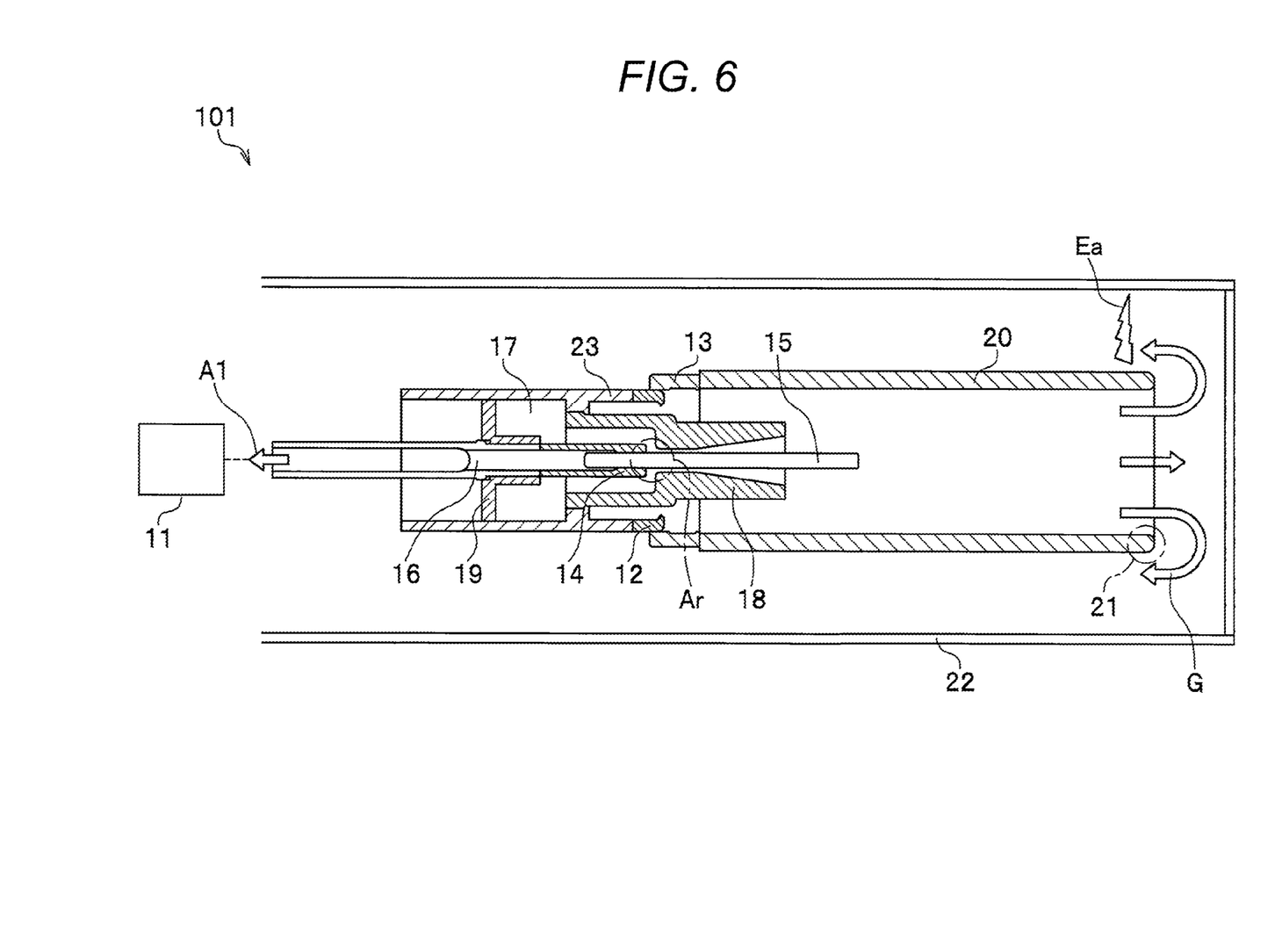
FIG. 6 is a cross-sectional view illustrating a configuration of a gas circuit breaker according to a comparative example.

Here, as a gas circuit breaker 101 shown in FIG. 6 is provided as a comparative example, a technical feature of the gas circuit breaker 1 according to the present embodiment 1 is described while comparing operation of the gas circuit breaker 101 according to the comparative example and operation of the gas circuit breaker 1 according to the present embodiment 1. FIG. 6 is a cross-sectional view illustrating a configuration of the gas circuit breaker 101 according to the comparative example.

As shown in FIG. 6, when compared with the gas circuit breaker 1 according to the present embodiment 1, in the gas circuit breaker 101 according to the comparative example, there is a difference that the closing plate 30 (see FIG. 1) is not arranged inside the exhaust pipe 20.

In such a gas circuit breaker 101 according to the comparative example, since a flow speed of the heat gas is fast, the heat gas reaches the high electric field part 21 with a high temperature. When the heat gas with a high temperature reaches the high electric field part 21, insulation performance between the exhaust pipe 20 and the sealed tank 22 is reduced due to the heat of the heat gas. As a result, in the gas circuit breaker 101 according to the comparative example, the grounding is easily generated between the exhaust pipe 20 and the sealed tank 22 (especially, near the high electric field part 21).

Against this, as shown in FIG. 1, in the gas circuit breaker 1 according to the present embodiment 1, the closing plate 30 is arranged inside the exhaust pipe 20. Further, as shown in FIG. 2, one or more vent hole(s) H30 which leads the heat gas from the inside of the exhaust pipe 20 toward the outside is formed on the surface of the closing plate 30.

Such a gas circuit breaker 1 can increase a resistance of a passage (an inside of the exhaust pipe 20). Thus, the gas circuit breaker 1 can reduce the flow speed of the heat gas. With this, the gas circuit breaker 1 can extend a time until the heat gas reaches the high electric field part 21. Thus, the gas circuit breaker 1 can dissipate the heat of the heat gas during a period until the heat gas with a high temperature reaches the high electric field part 21 and reduce the temperature of the heat gas exhausted into the sealed tank 22. As a result, the gas circuit breaker 1 can cool the heat gas enough to prevent the grounding from being generated between the exhaust pipe 20 and the sealed tank 22 (especially, near the high electric field part 21). Accordingly, the gas circuit breaker 1 can prevent the generation of the grounding.

In addition, since such a gas circuit breaker 1 has a simple structure having the small number of parts compared to the conventional gas circuit breaker disclosed in US 2014/0209568 A, assembling man hour can be reduced and a cost in manufacturing can be reduced.

Further, since the gas circuit breaker 1 has the simple structure compared to the conventional gas circuit breaker disclosed in US 2014/0209568 A, for example, cooling performance against the heat gas can be improved by expanding a diameter of the exhaust pipe 20. Further, since the gas circuit breaker 1 has the simple structure compared to the conventional gas circuit breaker disclosed in US 2014/0209568 A, for example, an electric field between the exhaust pipe 20 and the sealed tank 22 can be reduced by expanding a diameter of the sealed tank 22. With this, the gas circuit breaker 1 can also prevent the generation of the grounding between the exhaust pipe 20 and the sealed tank 22 (especially, near the high electric field part 21).

Further, in recent years, it is promoted to use high voltage and large current in the power system. In accordance with this, in order to obtain performance necessary for interrupting the short circuit current, the gas circuit breaker is desired to store relatively large amount of the insulation gas. On the other hand, downsizing of the gas circuit breaker is also desired. Since the gas circuit breaker 1 according to the present embodiment 1 has the simple structure having the small number of parts, both of these desires can be fulfilled.

Further, in the example shown in FIG. 2, a plurality of the vent holes H30 is formed on the surface of the closing plate 30. However, the number of the vent holes H30 may be one as long as the flow speed of the heat gas passed through the vent hole H30 is reduced to an extent in which the generation of the grounding between the exhaust pipe 20 and the sealed tank 22 (especially, near the high electric field part 21) can be prevented.

As described above, according to the gas circuit breaker 1 according to the present embodiment 1, the heat gas can be cooled efficiently with the simple structure having the small number of parts.

Embodiment 2

Figure 3:
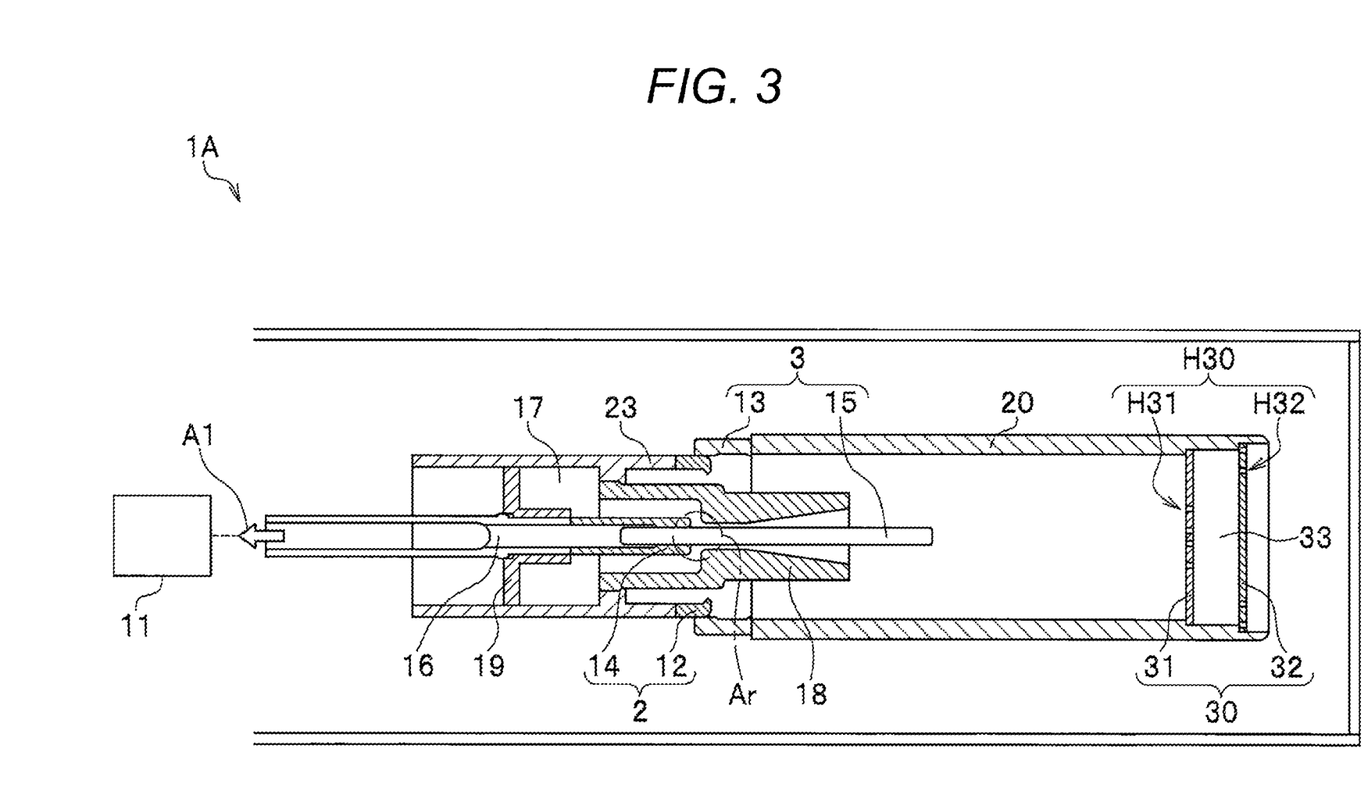
FIG. 3 is a cross-sectional view illustrating a configuration of a gas circuit breaker according to an embodiment 2.
Figure 4:
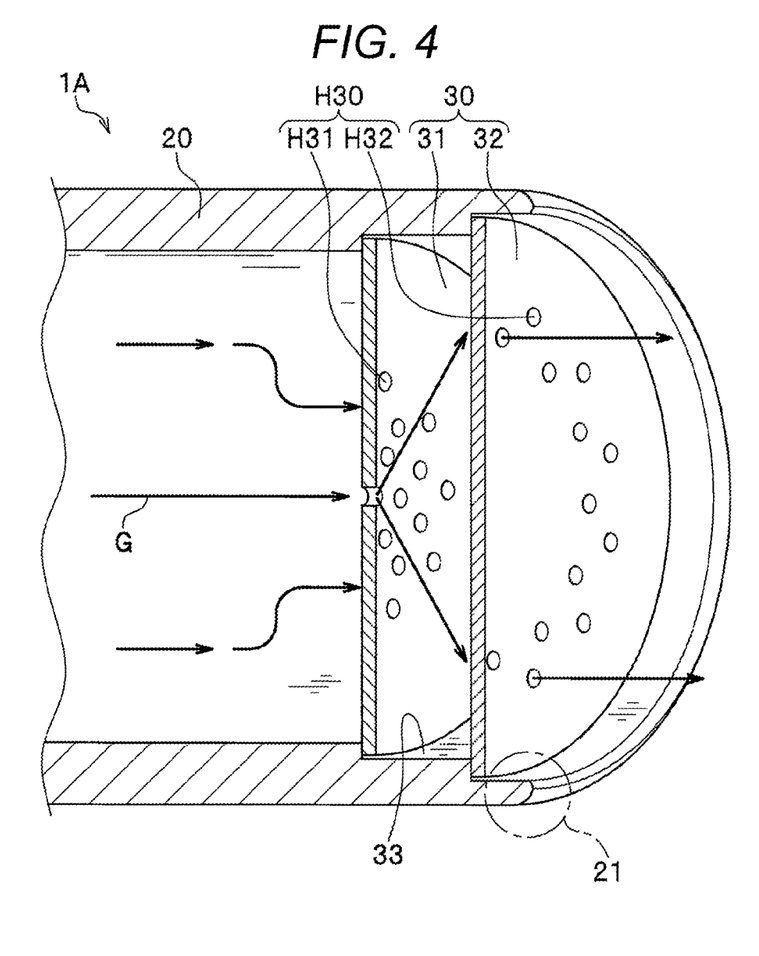
FIG. 4 is a view illustrating a configuration of a closing plate of the gas circuit breaker according to the embodiment 2.

Hereinafter, a configuration of a gas circuit breaker 1A according to a present embodiment 2 is described with reference to FIG. 3 and FIG. 4. FIG. 3 is a cross-sectional view illustrating the configuration of the gas circuit breaker 1A according to the present embodiment 2. FIG. 4 is a view illustrating a configuration of a closing plate 30 of the gas circuit breaker 1A.

As shown in FIG. 3, when compared with the gas circuit breaker 1 according to the embodiment 1 (see FIG. 1), in the gas circuit breaker 1A according to the present embodiment 2, there is a difference that two closing plates 30 are arranged inside an exhaust pipe 20. A plurality of vent holes H30 is formed on a surface of each of the two closing plates 30.

Hereinafter, in order to distinguish the two closing plates 30, the closing plate 30 closer to an insulation nozzle 18 is called "inner side closing plate 31", and the closing plate 30 farther from the insulation nozzle 18 is called "outer side closing plate 32". Further, in order to distinguish the vent holes H30 formed on the surfaces of the respective two closing plates 30, the vent hole H30 formed on the surface of the inner side closing plate 31 is called "inner side vent hole H31", and the vent hole H30 formed on the surface of the outer side closing plate 32 is called "outer side vent hole H32".

In the gas circuit breaker 1A, a space between the inner side closing plate 31 and the outer side closing plate 32 is formed to work as a mixing chamber 33 for mixing the heat gas (low temperature gas) when a certain time is elapsed after the heat gas is exhausted from the insulation nozzle 18 and the heat gas (high temperature gas) right after the heat gas is exhausted from the insulation nozzle 18. That is, the gas circuit breaker 1A retains a part of the heat gas exhausted from the insulation nozzle 18 in the mixing chamber 33 and dissipates heat of the heat gas in the mixing chamber 33. With this, the gas circuit breaker 1A reduces the temperature of the heat gas retained in the mixing chamber 33. As a result, the temperature of the heat gas retained in the mixing chamber 33 (namely, the heat gas when a certain time is elapsed after the heat gas is exhausted from the insulation nozzle 18) is reduced. Further, when the heat gas with a high temperature is exhausted from the insulation nozzle 18 during the time in which the short circuit current is interrupted, the gas circuit breaker 1A mixes the heat gas (the low temperature gas) retained in the mixing chamber 33 after the heat is dissipated and the heat gas (the high temperature gas) right after the heat gas is exhausted from the insulation nozzle 18 in the mixing chamber 33. With this, the gas circuit breaker 1A can cool the heat gas exhausted into the sealed tank 22 from a distal end side of the exhaust pipe 20 efficiently.

As shown in FIG. 4, in the gas circuit breaker 1A, a certain percentage or more of the inner side vent holes H31 is arranged not to be overlapped with the outer side vent hole H32 on the same axis. That is, a certain percentage or more of the inner side vent holes H31 is arranged on an axis different from that of the outer side vent hole H32. Specifically, more than 90% of the total area of the inner side vent holes H31 is arranged not to be overlapped with the outer side vent hole H32 on the same axis. That is, more than 90% of the total area of the inner side vent holes H31 is arranged on an axis different from that of the outer side vent hole H32.

Further, in the gas circuit breaker 1A, a certain percentage or more of the inner side vent holes H31 is arranged at a position relatively near a center of the inner side closing plate 31, and a certain percentage or more of the outer side vent holes H32 is arranged at a position relatively far from a center of the outer side closing plate 32.

In such a gas circuit breaker 1A, the heat gas with a high temperature generated at the arc generation part Ar (see FIG. 3) is at first passed through the inside of the inner side vent hole H31 and then passed through the inside of the outer side vent hole H32 and then exhausted into the inside of the sealed tank 22 from a distal end side of the exhaust pipe 20 during the time in which the short circuit current is interrupted. At that time, the heat gas with a high temperature is moved from the inner side vent hole H31 arranged at the position relatively near the center of the inner side closing plate 31 toward the outer side vent hole H32 arranged relatively far from the center of the outer side closing plate 32 in the mixing chamber 33. Thus, the gas circuit breaker 1A can lengthen the passage of the heat gas from the inner side closing plate 31 toward the high electric field part 21. Further, the gas circuit breaker 1A can make the inner side vent hole H31 and the outer side vent hole H32 work as a resistance of the passage. Thus, the gas circuit breaker 1A can reduce the flow speed of the heat gas.

With these causes, the gas circuit breaker 1A can delay the time when the heat gas with a high temperature reaches the high electric field part 21. Thus, the gas circuit breaker 1A can dissipate the heat of the heat gas until the heat gas with a high temperature reaches the high electric field part 21 and the gas circuit breaker 1A can reduce the temperature of the heat gas when the heat gas is exhausted into the sealed tank 22. As a result, the gas circuit breaker 1A can cool the heat gas enough to prevent the grounding from being generated between the exhaust pipe 20 and the sealed tank 22 (especially, near the high electric field part 21).

According to an experiment, in a case in which the inner side vent holes H31 are arranged such that more than 90% of the total area of the inner side vent holes H31 is arranged in a region within a distance of two third of a radius of the inner side closing plate 31 from the center of the inner side closing plate 31 and the outer side vent holes H32 are arranged such that more than 90% of the total area of the outer side vent holes H32 is arranged in a region out of a distance of two third of a radius of the outer side closing plate 32 from the center of the outer side closing plate 32, a good result can be obtained by the gas circuit breaker 1A. That is, in this case, the gas circuit breaker 1A can cool the heat gas enough to prevent the grounding from being generated between the exhaust pipe 20 and the sealed tank 22 (especially, near the high electric field part 21).

In such a configuration, in order to retain a part of the heat gas exhausted from the insulation nozzle 18 in the mixing chamber 33, and in order to reduce the flow speed of the heat gas exhausted into the sealed tank 22 from the distal end side of the exhaust pipe 20, the total area of the outer side vent holes H32 is preferably set in a half of the total area of the inner side vent holes H31.

Further, since the heat gas with a high temperature and high pressure is passed through the inside of the inner side vent hole H31 and the outer side vent hole H32, it is preferable that strength of the inner side closing plate 31 and strength of the outer side closing plate 32 are ensured. Accordingly, the gas circuit breaker 1A ensures the strength of the inner side closing plate 31 and the strength of the outer side closing plate 32 by arranging a plurality of the inner side vent holes H31 and a plurality of the outer side vent holes H32 and by setting each size of the inner side vent holes H31 and the outer side vent holes H32 to be small.

<Main Characteristics of the Gas Circuit Breaker>

(1) In the gas circuit breaker 1A, a certain percentage or more of the inner side vent holes H31 is arranged not to be overlapped with the outer side vent holes H32 on the same axis. That is, a certain percentage or more of the inner side vent holes H31 is arranged on an axis different from that of the outer side vent hole H32.

In such a gas circuit breaker 1A, the heat gas is passed through the inside of the inner side vent hole H31 and then the heat gas is passed through the inside of the outer side vent hole H32 during the time in which the short circuit current is interrupted. Thus, the gas circuit breaker 1A can lengthen the passage of the heat gas from the inner side closing plate 31 toward the high electric field part 21. Further, the gas circuit breaker 1A can make the inner side vent hole H31 and the outer side vent hole H32 work as a resistance of the passage. Thus, the gas circuit breaker 1A can reduce the flow speed of the heat gas.

Further, the gas circuit breaker 1A can promote the mixing of the low temperature gas and the high temperature gas in the mixing chamber 33 by increasing the resistance of the passage of the heat gas by setting the total area of the outer side vent holes H32 to be smaller than the total area of the inner side vent holes H31 (especially, setting the total area of the outer side vent holes H32 to be smaller than a half the total area of the inner side vent holes H31) and by lengthening the retaining time of the heat gas in the mixing chamber 33.

Such a gas circuit breaker 1A can reduce the temperature of the heat gas when the heat gas is exhausted into the sealed tank 22 and can cool the heat gas enough to prevent the grounding from being generated between the exhaust pipe 20 and the sealed tank 22 (especially, near the high electric field part 21).

In addition, the gas circuit breaker 1A can cool the heat gas efficiently compared to the gas circuit breaker 1 according to the embodiment 1.

(2) The diameter of the inner side closing plate 31 is set to be smaller than the diameter of the outer side closing plate 32. Further, a distal end part of the exhaust pipe 20 is formed in a stepped shape having a part of an inside formed to be the same diameter as the inner side closing plate 31 and a part of the inside formed to be the same diameter as the outer side closing plate 32.

Further, a bolt hole (not shown) is formed on a circumferential surface of the exhaust pipe 20, and the inner side closing plate 31 and the outer side closing plate 32 are fixed to the exhaust pipe 20 by a bolt. With this fixing method, since the inner side closing plate 31 and the outer side closing plate 32 can be fixed to the exhaust pipe 20 from the distal end side, the gas circuit breaker 1A can improve assembling performance.

(3) In the gas circuit breaker 1A, the outer side closing plate 32 is attached at a position inner (at a side closer to the insulation nozzle 18) than the high electric field part 21 at the distal end of the exhaust pipe 20. This is to avoid that the electric field becomes high near the outer side vent hole H32 and the grounding is easily generated near the outer side vent hole H32 when the outer side closing plate 32 is attached at a position of the distal end of the exhaust pipe 20. That is, the gas circuit breaker 1A reduces the electric field near the outer side vent hole H32 by attaching the outer side closing plate 32 at the position inner (at the side closer to the insulation nozzle 18) than the high electric field part 21 at the distal end of the exhaust pipe 20 and thereby the gas circuit breaker 1A suppresses the generation of the grounding near the outer side vent hole H32.

As described above, according to the gas circuit breaker 1A according to the present embodiment 2, similar to the gas circuit breaker 1 according to the embodiment 1, the heat gas can be cooled efficiently with the simple structure having the small number of parts.

In addition, according to the gas circuit breaker 1A, the heat gas can be cooled efficiently compared to the gas circuit breaker 1 according to the embodiment 1.

Embodiment 3

Figure 5:
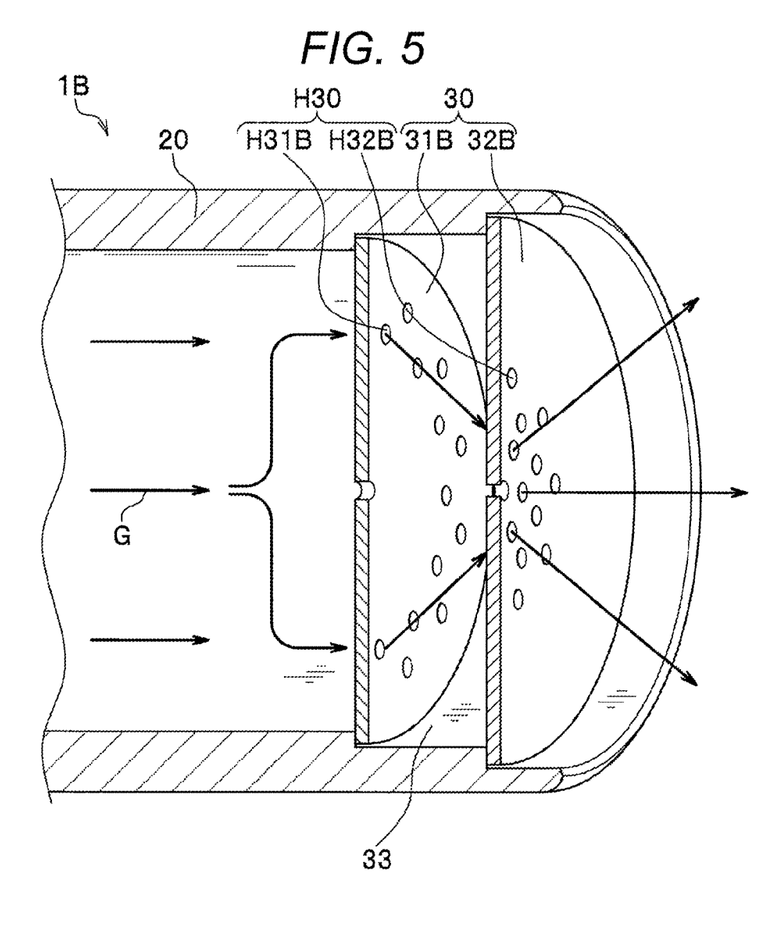
FIG. 5 is a view illustrating a configuration of a closing plate of a gas circuit breaker according to an embodiment 3.

Hereinafter, a configuration of a gas circuit breaker 1B according to a present embodiment 3 is described with reference to FIG. 5. FIG. 5 is a view illustrating a configuration of a closing plate of the gas circuit breaker according to the present embodiment 3.

As shown in FIG. 5, when compared with the gas circuit breaker 1A according to the embodiment 2 (see FIG. 4), in the gas circuit breaker 1B according to the present embodiment 3, there is a difference that an inner side closing plate 31B and an outer side closing plate 32B are arranged instead of the inner side closing plate 31 and the outer side closing plate 32.

When compared with the inner side closing plate 31 (see FIG. 4), in the inner side closing plate 31B, there is a difference that a certain percentage or more of an inner side vent holes H31B is arranged at a position relatively far from a center of the inner side closing plate 31B. Further, when compared with the outer side closing plate 32 (see FIG. 4), in the outer side closing plate 32B, there is a difference that a certain percentage or more of an outer side vent holes H32B is arranged at a position relatively near a center of the outer side closing plate 32B.

The gas circuit breaker 1B according to the present embodiment 3 can, similar to the gas circuit breaker 1A according to the embodiment 2 (see FIG. 4), lengthen the passage of the heat gas from the inner side closing plate 31B toward the high electric field part 21. Further, the gas circuit breaker 1B can make the inner side vent hole H31B and the outer side vent hole H32B work as a resistance of the passage. Thus, the gas circuit breaker 1B can reduce the flow speed of the heat gas. As a result, the gas circuit breaker 1B can cool the heat gas enough to prevent the grounding from being generated between the exhaust pipe 20 and the sealed tank 22 (especially, near the high electric field part 21).

In addition, in the gas circuit breaker 1B, most of the outer side vent holes H32B are arranged near the center of the outer side closing plate 32B. Thus, the gas circuit breaker 1B can set the length of the passage from the outer side vent hole H32B toward the high electric field part 21 to be longer than the length of the passage from the outer side vent hole H32 (see FIG. 4) toward the high electric field part 21 of the gas circuit breaker 1A according to the embodiment 2. Accordingly, the gas circuit breaker 1B can delay the time when the heat gas reaches the high electric field part 21 compared to the gas circuit breaker 1A according to the embodiment 2. As a result, the gas circuit breaker 1B can improve cooling performance against the heat gas, and therefore the gas circuit breaker 1B can cool the heat gas further efficiently compared to the gas circuit breaker 1A according to the embodiment 2.

According to an experiment, in a case in which the inner side vent holes H31B are arranged such that more than 90% of the total area of the inner side vent holes H31B is arranged in a region out of a distance of two third of a radius of the inner side closing plate 31B from the center of the inner side closing plate 31B and the outer side vent holes H32B are arranged such that more than 90% of the total area of the outer side vent holes H32B is arranged in a region within a distance of two third of a radius of the outer side closing plate 32B from the center of the outer side closing plate 32B, a good result can be obtained by the gas circuit breaker 1B.

As described above, according to the gas circuit breaker 1B according to the present embodiment 3, similar to the gas circuit breakers 1, 1A according to other embodiments, the heat gas can be cooled efficiently with the simple structure having the small number of parts.

In addition, according to the gas circuit breaker 1B, the heat gas can be cooled further efficiently compared to the gas circuit breaker 1B according to the embodiment 2.

The present invention is not limited to the embodiments described above, and the present invention includes various modified examples. For example, the embodiments described above have been described in detail to easily describe the present invention, and the present invention is not necessarily limited to one including all the described configurations. Further, a part of configurations of a certain embodiment can be replaced with a configuration of another embodiment. Further, a configuration of another embodiment can be added to a configuration of a certain embodiment. Further, another configuration can be added to/deleted from/replaced with a part of a configuration of each embodiment.

For example, in each embodiment described above, the gas circuit breakers 1, 1A, 1B are formed to be fixed to the fixed side arc electrode 15. However, the present invention may be applied to a both driving type gas circuit breaker in which an arc electrode facing the movable side arc electrode 14 is relatively moved against the movable side arc electrode 14.

Further, for example, in each embodiment described above, the gas circuit breakers 1, 1A, 1B are formed to have only the puffer chamber 17 as the mechanical compression chamber. However, the prevent invention may be applied to a gas circuit breaker in which one or both of the mechanical compression chamber and a thermal expansion chamber is/are arranged.

Further, for example, in the embodiment 2 and the embodiment 3 described above, the two closing plates 30 are arranged in the exhaust pipe 20. However, the number of the closing plates 30 may be set more than three.

Further, a position of each closing plate 30 and/or an interval between the closing plates 30 can be set in any manner.

Further, for example, in the embodiment 2 described above, a plurality of the inner side vent holes H31 is formed on the inner side closing plate 31, and a plurality of the outer side vent holes H32 is formed on the outer side closing plate 32. However, the number of the inner side vent holes H31 and the number of the outer side vent holes H32 can be set in any manner as long as the total area of the outer side vent holes H32 is smaller than the total area of the inner side vent holes H31. Further, a shape of the inner side vent hole H31 and a shape of the outer side vent hole H32 can be also set in any manner. Further, a ratio in which the inner side vent hole H31 and the outer side vent hole H32 are overlapped can be also set in any manner.

Similarly, the number of the inner side vent holes H31B and the number of the outer side vent holes H32B in the embodiment 3 can be also set in any manner as long as the total area of the outer side vent holes H32B is smaller than the total area of the inner side vent holes H31B. Further, a shape of the inner side vent hole H31B and a shape of the outer side vent hole H32B can be also set in any manner.

Further, a ratio in which the inner side vent hole H31B and the outer side vent hole H32B are overlapped can be also set in any manner.

What is claimed is:

1. A gas circuit breaker comprising:
    a sealed tank;
    a movable side main electrode and a fixed side main electrode arranged in the sealed tank to face each other in such a manner in which opening electrode operation and closing electrode operation can be performed;
    a movable side arc electrode and a fixed side arc electrode arranged in the sealed tank to face each other in such a manner in which opening electrode operation and closing electrode operation can be performed;
    a cylinder arranged at a circumference of the movable side arc electrode;
    a piston arranged in the cylinder in a slidable manner, the piston forming a puffer chamber together with the cylinder;
    an insulation nozzle arranged in the sealed tank;
    an exhaust pipe arranged at a circumference of the fixed side arc electrode and configured to exhaust heat gas, which is sprayed on an arc generated in the insulation nozzle in the opening electrode operation, to an outside; and
    a plurality of closing plates arranged in the exhaust pipe,
    wherein a plurality of vent holes is formed on the surface of each of the closing plates,
        the vent holes of an inner side closing plate which is arranged closest to the insulation nozzle among the closing plates are formed such that at least 90% of a total area of the vent holes is formed in a region within a diameter of two third of a radius of the inner side closing plate from a center of the inner side closing plate, and
        the vent holes of an outer side closing plate which is arranged farthest from the insulation nozzle among the closing plates are formed such that at least 90% of a total area of the vent holes is formed in a region out of a distance of two third of a radius of the outer side closing plate from a center of the outer side closing plate.

2. A gas circuit breaker comprising:
    a sealed tank;
    a movable side main electrode and a fixed side main electrode arranged in the sealed tank to face each other in such a manner in which opening electrode operation and closing electrode operation can be performed;
    a movable side arc electrode and a fixed side arc electrode arranged in the sealed tank to face each other in such a manner in which opening electrode operation and closing electrode operation can be performed;
    a cylinder arranged at a circumference of the movable side arc electrode;
    a piston arranged in the cylinder in a slidable manner, the piston forming a puffer chamber together with the cylinder;
    an insulation nozzle arranged in the sealed tank;
    an exhaust pipe arranged at a circumference of the fixed side arc electrode and configured to exhaust heat gas, which is sprayed on an arc generated in the insulation nozzle in the opening electrode operation, to an outside; and
    a plurality of closing plates arranged in the exhaust pipe,
    wherein a plurality of the vent holes is formed on the surface of each of the closing plates,
        the vent holes of an inner side closing plate which is arranged closest to the insulation nozzle among the closing plates are formed such that at least 90% of a total area of the vent holes is formed in a region out of a distance of two third of a radius of the inner side closing plate from a center of the inner side closing plate, and
        the vent holes of an outer side closing plate which is arranged farthest from the insulation nozzle among the closing plates are formed such that at least 90% of a total area of the vent holes is formed in a region within a distance of two third of a radius of the outer side closing plate from a center of the outer side closing plate.

* * * * *